United States Patent [19]
Hidekura

[11] Patent Number: 5,325,807
[45] Date of Patent: Jul. 5, 1994

[54] WINDOW ASSEMBLY FOR ATTACHMENT TO A FLEXIBLE SHEET

[75] Inventor: Toshio Hidekura, Kawasaki, Japan

[73] Assignee: Toshio Hidekura, Kanagawa, Japan

[21] Appl. No.: 14,314

[22] Filed: Feb. 5, 1993

[30] Foreign Application Priority Data

Feb. 13, 1992 [JP] Japan ................................. 4-59384

[51] Int. Cl.⁵ ............................................. B63B 17/00
[52] U.S. Cl. ...................... 114/361; 114/177; 296/107; 296/145; 135/117
[58] Field of Search .............. 114/177, 361; 296/107, 296/145; 135/117

[56] References Cited

U.S. PATENT DOCUMENTS 1,469,229 10/1923 McAvoy ...................... 296/145
1,478,447 12/1923 Maranville .................. 296/145

Primary Examiner—Jesus D. Sotelo
Attorney, Agent, or Firm—Bauer & Schaffer

[57] ABSTRACT

A window assembly is formed having a receiving member set in contact with one surface of pliant sheet, a holding member set in contact with the other surface of the pliant sheet, with the sheet held fixedly between them. A frame cover is attached to the receiving members, and a rigid transparent pane is secured fixedly between the cover and the holding member.

4 Claims, 8 Drawing Sheets

WINDOW ASSEMBLY FOR ATTACHMENT TO A FLEXIBLE SHEET

FIELD OF THE INVENTION

The present invention relates to the structure and method of attachment of a window to a flexible wall partition or enclosure and, particularly, to a window attached to a sheet panel for the purpose of ensuring visual field of lighting such as on a vinyl enclosure of a ship, a tent or a protective wall in a warehouse or an agricultural structure.

PRIOR ART

Conventionally, the normally open cabin of a pleasure boat, as shown in FIG. 10, is provided with a vinyl enclosure B formed of one or more transparent vinyl sheets D stretched around outside supporting members C.

PROBLEMS OF THE PRIOR ART

Generally, the surface of the vinyl sheet D is apt to be injured in use, and, when so injured, the vinyl sheet becomes cloudy, resulting in a deteriorated transparency (degree of clearness). Further, when the vinyl sheet D is subjected to sun rays for a long time or is exposed to sea breeze, it is discolored yellow so that the transparency is also deteriorated. In addition, the vinyl sheet D may expand or contract because of changes in external temperature so that is becomes strained, creased or deformed. For this reason, the visual field through the vinyl sheet D of the enclosure B becomes poor over time. If a man steers a cruiser A while looking at sea through a vinyl sheet D of poor visual field, there is the possibility that the sighting of an obstacle such as rubbish or buoy, etc. may be delayed. As a result, the cruiser may collide against the obstacle, leading to damages to the screw of the cruiser A or an accidental collision. This is very dangerous.

Some enclosures B are adapted as shown in FIG. 11. Namely, window flap F of the same material as that of the vinyl sheet D is attached through a fastener E in the enclosure B so as to be opened as by winding the flap up or closing as by allowing the flap to fall down according to need. However, there is the problem that when the window flap F is repeatedly wound up, it has a tendency to become deformed so that the visual field becomes poor when the window flap F is down.

In order to solve the various problems mentioned above, a new vinyl sheet would be used in place of old vinyl sheet D. However, since the quality of the vinyl sheet deteriorates with the passage of time, it is necessary to exchange it for a new vinyl sheet a second time. Eventually, the same procedure is repeated frequently. In addition, every time a new vinyl sheet is provided, considerable cost for replacement is incurred. Since the economical burden is great, this method cannot offer a fundamental solution.

In order to essentially solve the above-mentioned problems, it has been found effective to employ a method of replacing vinyl sheet D of vinyl enclosure B by a glass window. However, it is necessary also to provide a specially made sash into which the window pane is fitted resulting in the problem that it takes considerable cost to do so. In addition, there is also the problem that since the above-mentioned method results in a fixed window system, opening and closing of the window cannot be carried out.

OBJECT OF THE INVENTION

An object of this invention is to provide a transparent window for a pliant sheet such as vinyl or other fabric, which can be easily attached to the sheet and which can ensure a satisfactory visual field for a long time. It is a further object to provide such a window for a vinyl enclosure for a boat or other vehicle but also for a tent, a curtain wall for a warehouse or an agricultural structure. It is yet another object to provide a method of attaching such a window to the sheet material.

SUMMARY OF THE INVENTION

The transparent window of this invention comprises a frame assembly having a receiving member set in contact with one surface of pliant sheet, a holding member set in contact with the other surface of the pliant sheet, and means to secure the receiving and holding members together with the sheet held fixedly between them. The assembly also includes a frame cover stop attached to the receiving members in a manner to secure a rigid transparent pane in fixed form between the cover stopper and the holding member.

The method of attaching the transparent window comprises the steps of: providing a receiving member on the inner or outer surface of the pliant sheet; providing a holding member in contact with the sheet on the opposite side of the receiving member to define a window frame; cutting and removing the portion of the pliant sheet inside the window frame; disposing a rigid transparent pane in the opening formed as the result of the removal of the sheet portion; placing a cover stop member over the holding member in contact with the transparent pane; and holding the transparent pane fixed within the window frame.

DETAILED DESCRIPTION OF THE INVENTION

Preferred Embodiment of This Invention

The present invention is illustrated in detail in FIGS. 1-8 in connection with the case where the transparent window is attached to a pliant sheet such as the vinyl enclosure for a ship.

Figure 1:
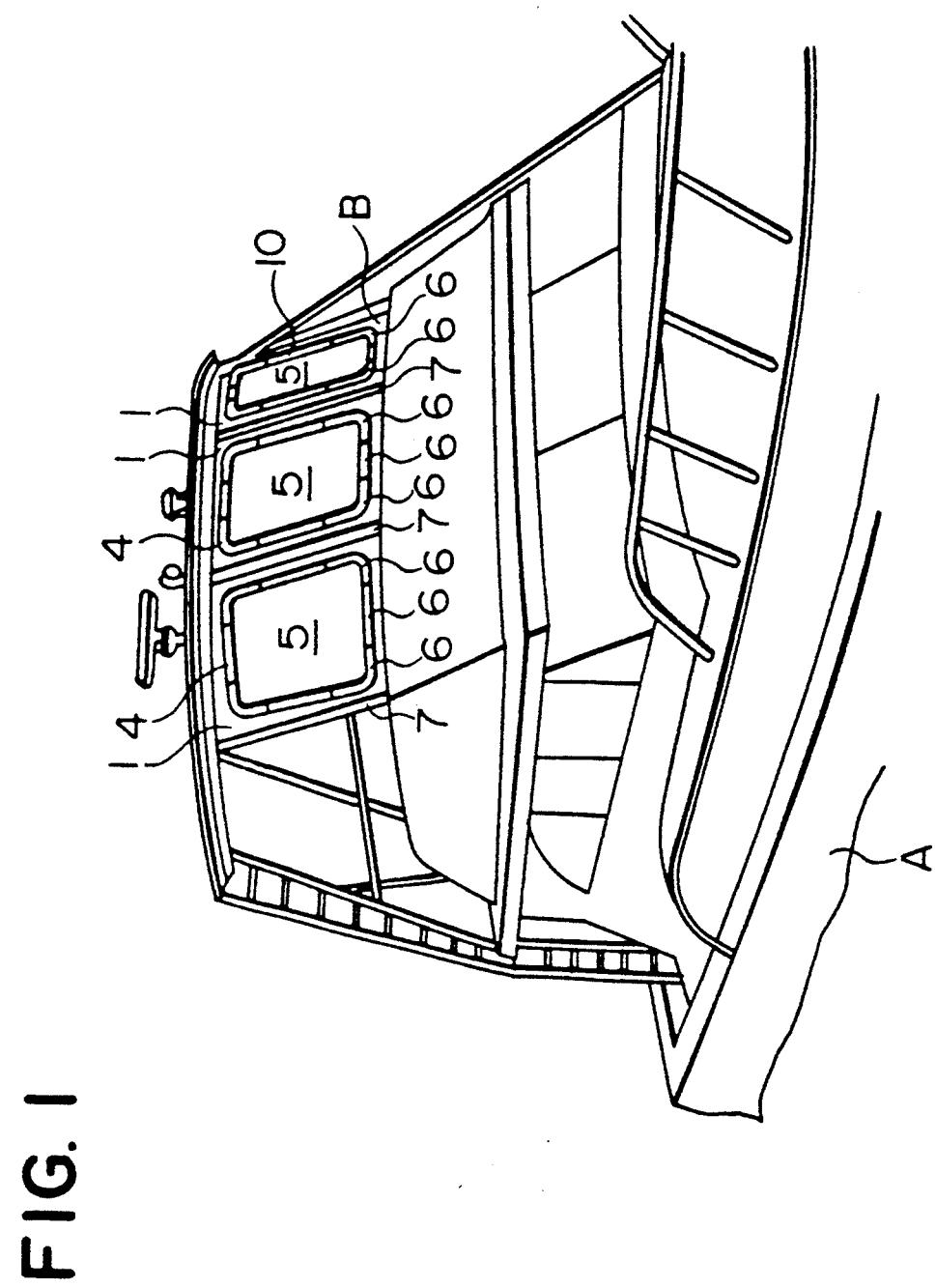
FIG. 1 is a perspective view showing an example of a vinyl enclosure for a cruiser to which a transparent window according to the present invention is attached.

Reference numeral 1 in FIGS. 1-4 denotes a pliant sheet of vinyl stretched on supporting members 7 of a cruiser A. As shown in FIG. 1, a plurality of window frames 4 are attached to the sheet, each containing a rigid transparent pane 5 held fixedly by a covering stopper member 6.

Figure 2:
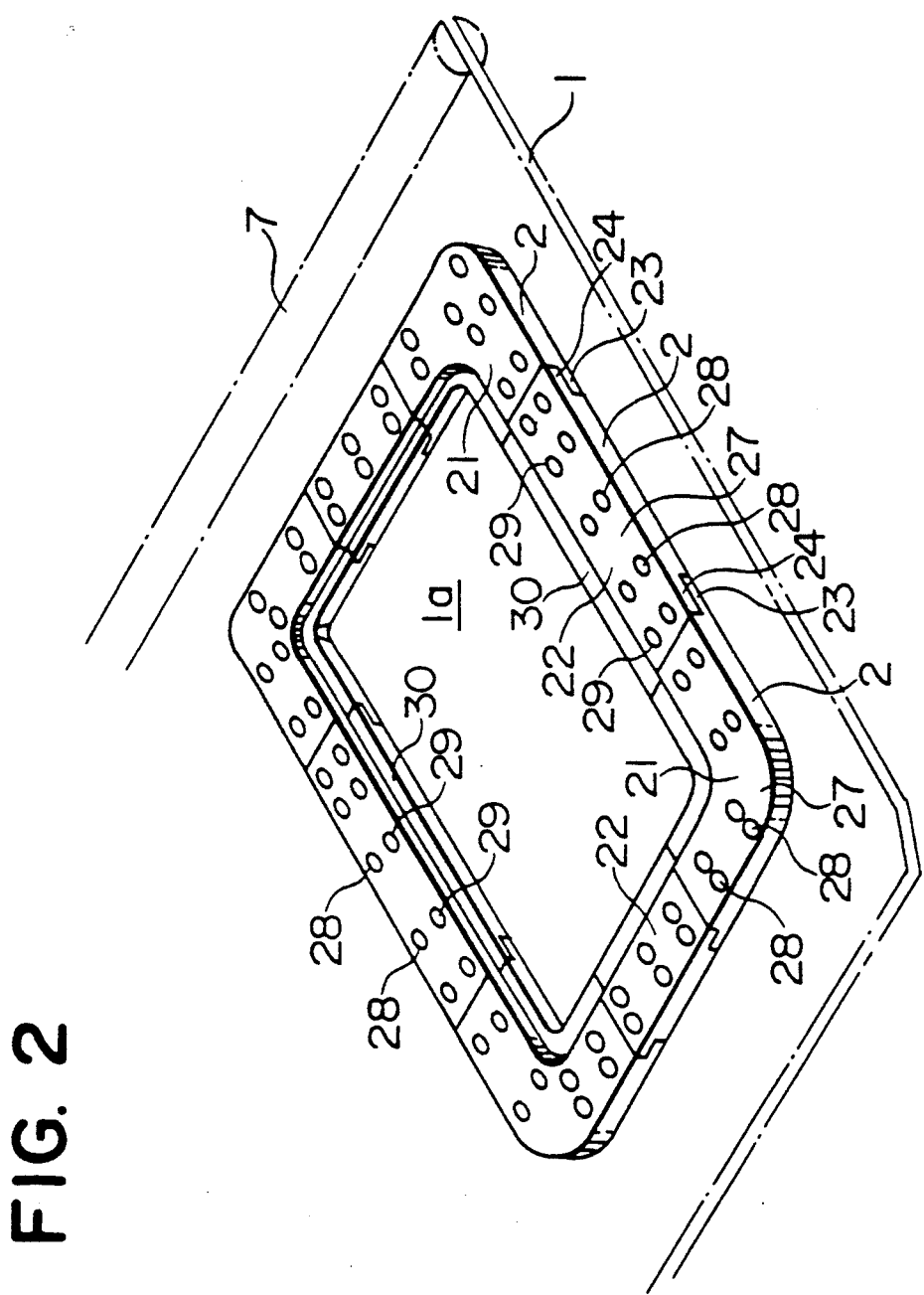
FIG. 2 is a perspective view showing the receiving members of the frame assembly provided in contact with the outer surface of a pliant sheet.
Figure 3:
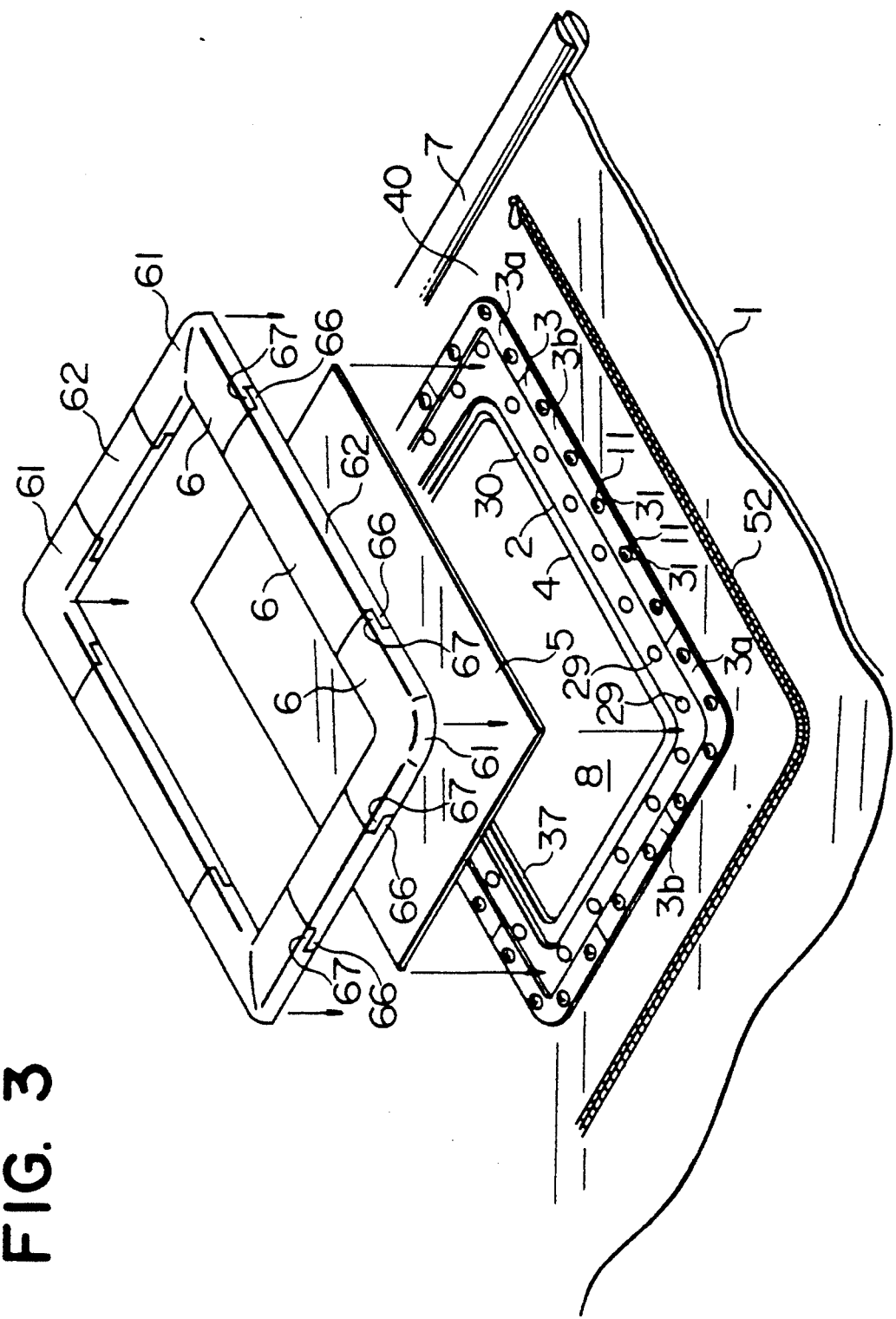
FIG. 3 is an exploded view of the window according to the present invention.
Figure 4A:
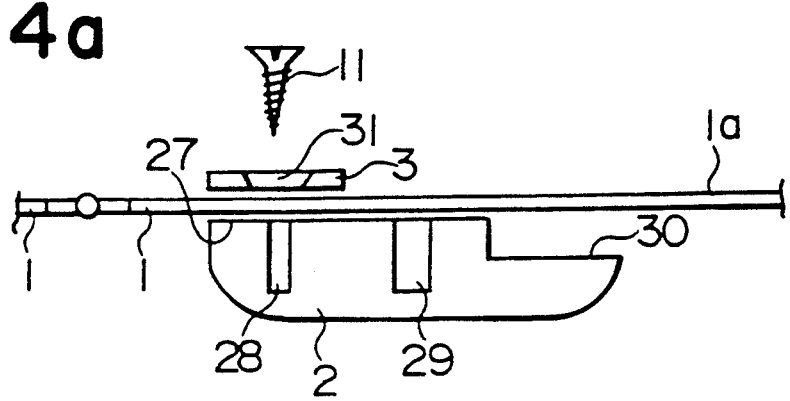
FIGS. 4a–4d are longitudinal cross sectional views through the window showing the attachment of the frame assembly and pane to the pliant sheet.

Each window frame 4 of FIG. 1 is comprised of a receiving member 2 (FIG. 2, FIG. 4a) and a holder member 3 (FIG. 3, FIG. 4a).

Figure 5:
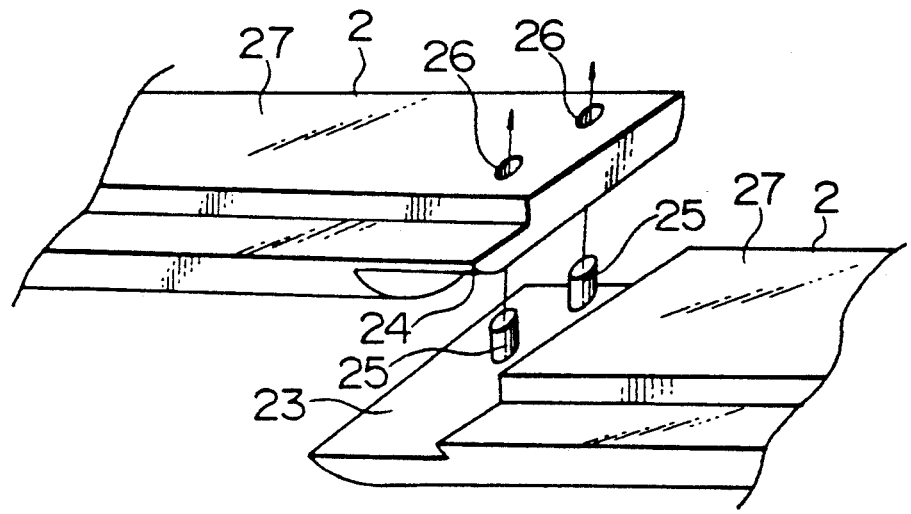
FIG. 5 is a perspective, partially exploded view showing connecting end portions of receiving members.

The receiving member 2 is comprised of a plurality of corner members 21 and linear members 22 as shown in FIG. 2, laid end to end in contact with the outer surface of the pliant sheet 1 as shown in FIG. 4a. The corner members 21 and linear members 22 are connected in a rectangular form to define a closed frame. The receiving members 2 are molded of hard plastic (e.g. AAS (Acrylic rubber Acrylonitrile Styrene) resin). The ends of the receiving member 2 are rabbeted to form thin overlapping portions 23, 24 which cooperate with each other to form a joint as shown in FIG. 5. One of the overlapping portions 23, is provided with posts 25 which are insertable into holes 26 formed in the other overlapping portion 24. By inserting these posts 25 through the through holes 26, connection of the two end to end receiving members 2 becomes firm and is difficult to be broken or folded. The receiving member 2, as shown in FIG. 4a, FIG. 5 is formed with a plane surface 27 extending in a wide band along its length and adapted to be in contact with the sheet 1. A plurality of stopper holes 28 (FIG. 2) are formed about the periphery of the receiving member 2 into which screws 11 are insertable at fixed intervals. Spaced interiorly from the holes 28 and also about the periphery of the receiving member are connection holes 29 (FIG. 2), into which other screws 12 are insertable. At the extreme inner edge in the width direction the receiving member 2 is rabbeted or cut down to define a contact portion 30 on which is laid the pane 5. The contact portion 30 is also planar but is at a step lower than the plane surface 27 on which the sheet 1 is laid.

Figure 7:
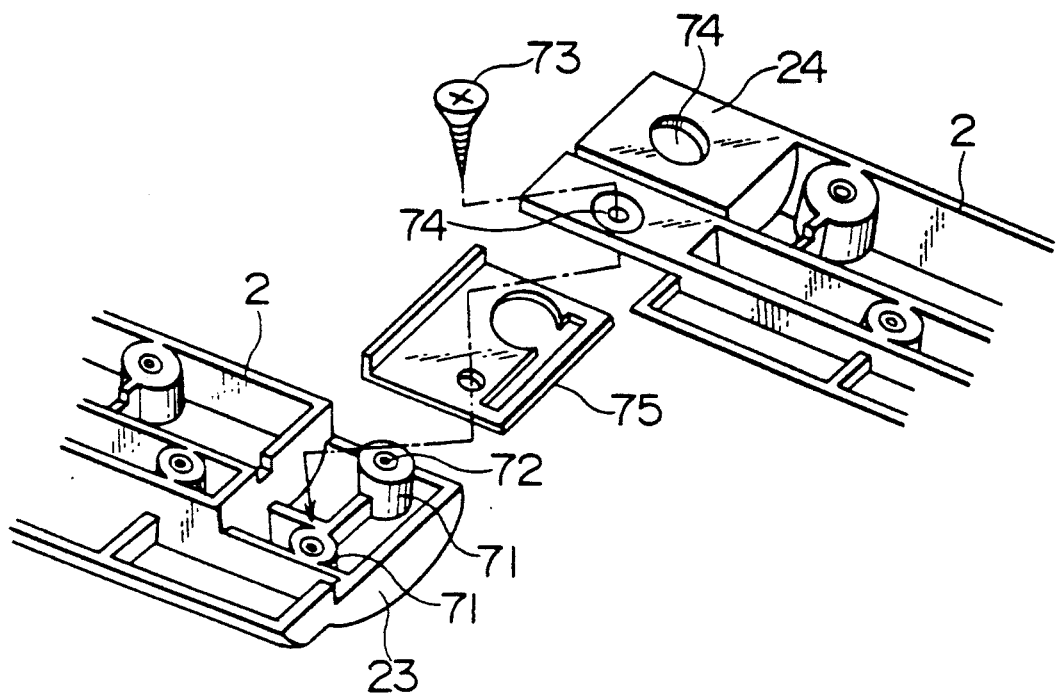
FIG. 7 is a perspective, partially exploded view showing another embodiment of connecting portions of receiving members.

The receiving member 2 may be formed as shown in FIG. 7 so that it is lighter in weight than the receiving member shown in FIG. 5. To realize this, the entirety of the receiving member 2, shown in FIG. 7, is molded of hard plastic so that it is generally hollow and its wall thickness is thin. Further, posts 71 provided in the one overlap portion 23 are formed with screw holes 72. In the other overlap portion 24 there are insertion holes 74 for inserting connecting screws 73. The overlap portions 23 and 24 are provided with a packing 75 molded of silicon rubber or the like which is compressed therebetween before being connected by connecting screws 73.

Figure 9:
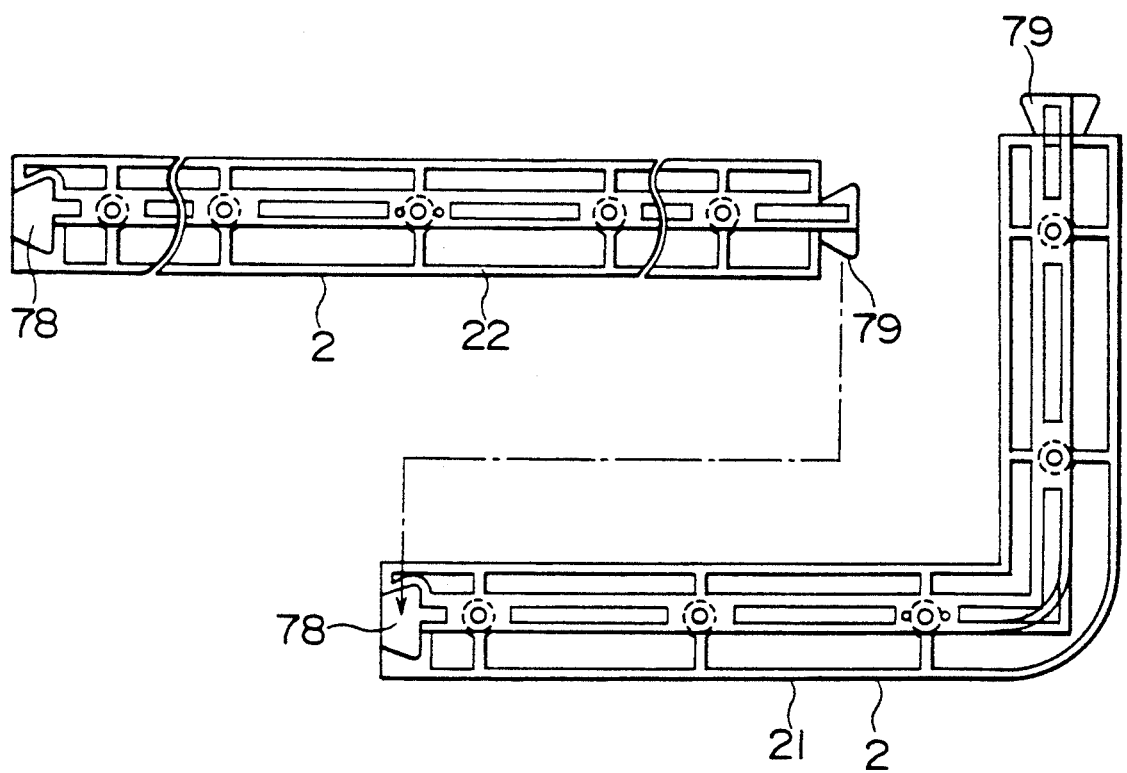
FIG. 9 is a plan view showing another embodiment of a receiving member.
Figure 10:
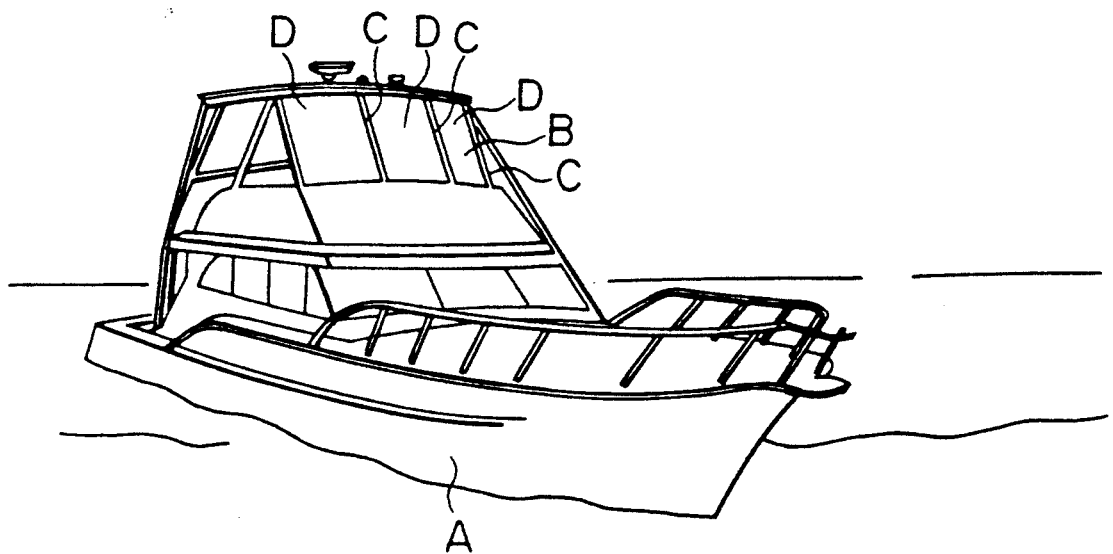
FIG. 10 is a perspective view of a conventional prior art cruiser.
Figure 11:
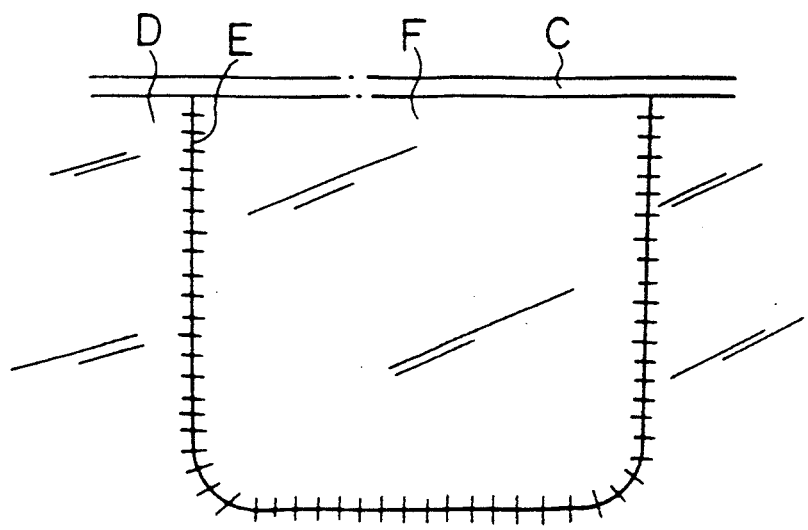
FIG. 11 is a frontal view showing an example of a conventional prior art vinyl enclosure of a cruiser.

Additionally, the receiving members 2 may also be formed as shown in FIG. 9. Here, the members 21 and 22 are formed of thin, hard plastic in an open latticework so that it is lighter in weight as compared to the receiving member of FIG. 5. The opposite ends of each member 21 or 22 are formed with an extending dovetail groove 78 and a mating dovetail mortise 79. By engaging the dovetail grooves 78 and dovetail mortise 79 with each other, two or more receiving members 2 (two linear members 22 or corner members 21 and linear members 22) can be easily connected to each other to form the frame.

Figure 4B:
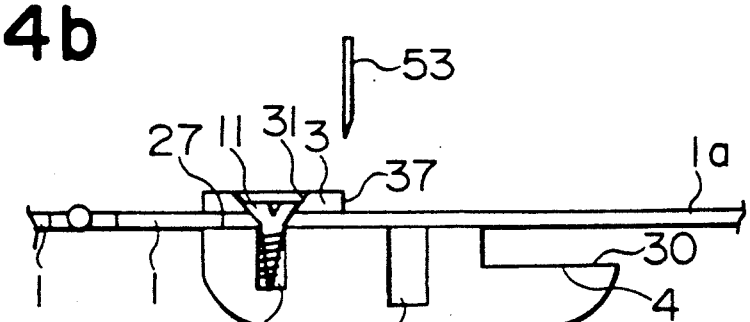

The holding member 3 is adapted to lie in contact with the pliant sheet 1 and compress it against the receiving member 2 as shown in FIG. 3, FIG. 4a. The holding member 3 is fixed by screws 11 inserted through the holes 28 of the receiving member 2. Thus, sheet 1 is fixed so that it is held securely between the holding member 3 and the receiving member 2 as shown in FIG. 4b. The holding member 3 is comprised of plastic corner members 3a and linear members 3b so that they form a thin and elongated frame as shown in FIG. 3, FIG. 4b. Screw holes 31 for inserting screws 11 are formed at fixed intervals about the periphery of the holding member 3.

Figure 4C:
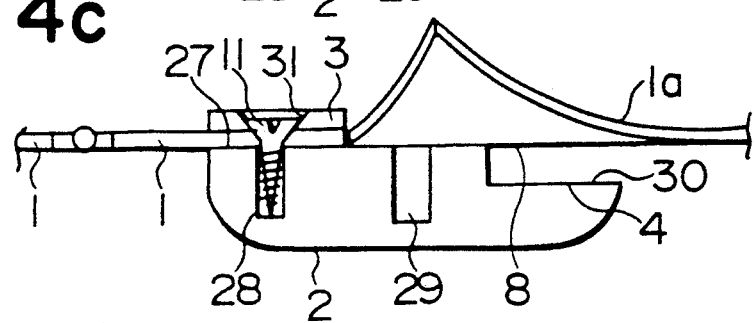
Figure 4D:
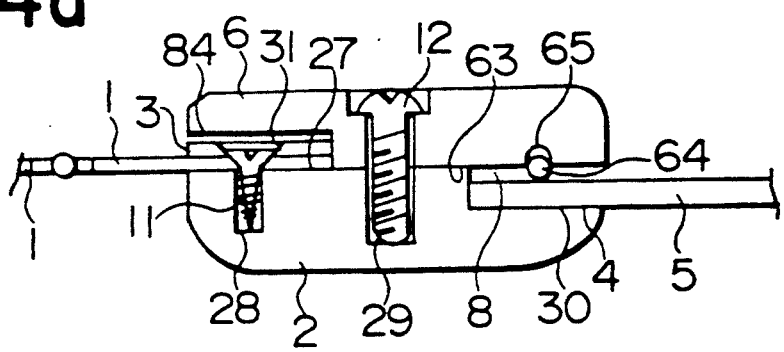

The cover stop member 6 lies on the receiving member 2, with the peripheral edge of the transparent pane 5 arranged as shown in FIG. 3, FIG. 4d in the opening 8 (FIG. 3) formed as the result of the space created by the cutout step portion 30, as shown in FIG. 4c. The stop member 6 is fixed to the receiving member 2 by screw 12, as shown in FIG. 4d. The stop member 6 is similarly comprised of corner members 61 and a linear members 62, as shown in FIG. 3. The bottom surface of the stop member 6, as shown in FIG. 4d, is formed with a plane surface 63 adapted to be in contact with the receiving member 2 at the center thereof and with a recessed portion 84 in contact with the holding member 3. The inner peripheral portion of the stop member 6 is formed with a groove 65 into which an O-ring packing 64 fits in pressure-contact with the transparent pane 5 to form an airtight seal. The members 61 and 62 of the stop member 6 also have thin overlap portions 66, 67 by which their ends are connected to each other as shown in FIG. 3. It is desirable to provide overlap portions 66 with posts (not shown) corresponding to the posts 25 of FIG. 5 and the other overlap portion 67 with through holes (not shown) corresponding to the through holes 26 of FIG. 5. Thus, interconnection of two stop members 6 is easy, while being difficult to be broken or folded.

Figure 8:
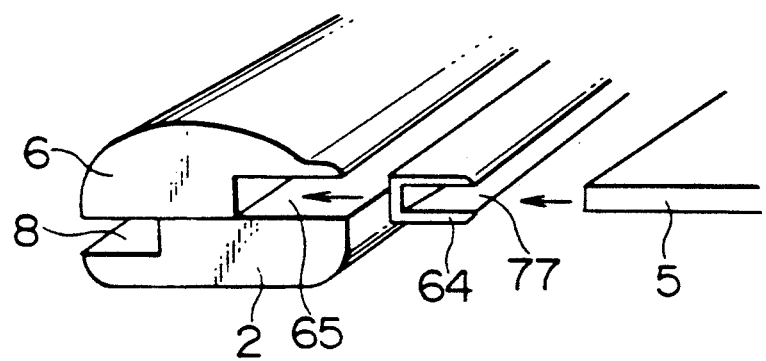
FIG. 8 is an end sectional view showing an example of a packing for the window pane.

The packing 64 may also be of a structure shown in FIG. 8. This packing 64 is molded of silicon rubber or the like and is formed having an overall rectilinear cross section and with its side edge formed with an elongated channel 77. The slot 65, into which the packing is seated, may be formed by recessing the bottom surface of the stop member 6, while omitting the recessing of the receiving plate 2. When using this packing, the pane 5 is fitted into the channel 77 of the rectangular and elongated packing 64 which is then inserted into the slot 65, as seen in FIG. 8.

Preferably, the transparent pane 5 is rigid, plate-like and has a fixed form. It should have a high transparency, be light in weight, and have excellent impact resistance, heat resistance, cold resistance, adiabatic property, sound screening property, and dimensional stabilization. The pane 5 should also be difficult to be injured, difficult to be cracked, difficult to be subjected to deterioration of transparency by sea breeze, rain or direct sun rays, etc. and have weather resistance. It is suitable to use a transparent pane of polycarbonate resin for this purpose. As an example, there is "PAN RAITO" sheet by Teijin Kasei Kabushiki Kaisha.

Figure 6:
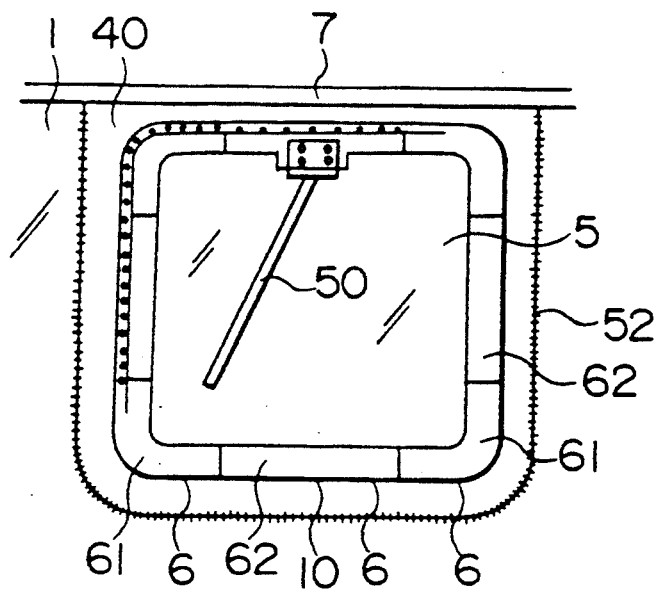
FIG. 6 is a front elevational view showing the placement of a wiper on the window.

Additionally, a wiper 50 may be attached as shown in FIG. 6 so as to permit the outer surface of the transparent pane 5 to be cleansed. For this wiper 50 any motor driver wiper available on the market may be used.

The transparent window pane may be attached to the vinyl enclosure sheet as shown in FIGS. 3, 6. The frame assembly 4 may be attached as described to a small vinyl panel 40 which is provided on three sides with a zipper fastener 52 connected to the vinyl enclosure. When such an approach is employed, the fastener 52 may be operated to open the panel 40 and lift the window attached thereto.

The transparent window of this invention may be attached to the outside of the fastener 52 separately from the opening and closing panel 40 of FIGS. 3 and 6.

While the receiving member 2, the holding member 3, and the stop member 6 are all respectively divided into a plurality of corner members and linear members each, i.e. the receiving member 2, the holding member 3, and the stop member 6 may be integrally molded in a unitary frame form. Further, one or even two of the receiving member 2, the holding member 3, and the stop member 6 may be integrally molded so that it is in a unitary frame form while the others may be divided into corner members and linear members as shown.

The outline or shape (form) of the window frame 4 is not critical and need not be limited to the shape shown, but may take other shapes. In this case, it is necessary to mold the receiving member 2, the holding member 3, and the stop member 6 to take a form such that the window frame assembly 4 that is desired is obtained.

The method for attaching the transparent window to the pliant sheet 1 (i.e. a vinyl boat enclosure) is described.

The elements of the receiving members 2 are sequentially placed as shown in FIG. 2 and FIG. 4a, in contact with the outer surface of a whole pliant sheets 1, which has been stretched on, for example, the supporting members 7 of ship as shown in FIG. 1. Corresponding holding members 3 are then placed in contact with the sheet 1 from the opposite side (inner surface) and screws 11 inserted through the holding member 3 as shown in FIG. 4b to fix these components to the sheet 1. The respective receiving members 2 are connected with their end portions 23, 24 overlapping with each other until a rectangular window frame 4 as shown in FIG. 2 is complete.

In this state, an edged cutting tool 53, as seen in FIG. 4b, is moved along the inner peripheral edge 37 of the holding member 3 to cut the inside portion 1a of the sheet 1 enclosed by the frame 4 so it can be removed as shown in FIG. 4c.

Then, as shown in FIGS. 3 and 4d, the transparent pane 5 is placed in the sight or opening 8 from which are portion of the sheet has been removed to rest on the lower platform 30 of the receiving member 2. The stop member 6 (corner members 61, linear members 62) are then placed about the frame 4 and fastened by screws 12 to the receiving member 2. The stop member 6 is provided with the seal 64 so that the transparent pane 5 is fixed firmly between the receiving member 2 and the stop member 6. In doing this, it is desirable that the position of the corner members 61 and linear members 62 be offset, i.e. shifted, relative to the position of the corner members 21 and the linear members 22 so that the respective joints are not overlying. This will strengthen the frame and make it difficult to be broken or folded.

It has been described that separate elements, receiving member 2, holding member 3, and the cover stop member 6 which are divided into corner member and linear member are attached to the sheet 1, one piece at a time. However, this method may be replaced by one in which a predetermined number of corner and linear pieces are preconnected in advance into a predetermined frame form and shape. In this way, the connected holding members 3 in frame form may be attached to the similarly formed receiving members 2 to form the window frame assembly 4 on the sheet 1. Similarly connected stop members 6 may be placed over the outside of the transparent pane 5 and fixed to the window frame 4.

According to the present invention, it is possible to easily attach the transparent rigid pane 5 at a desired location on the pliant sheet 1. In addition, since the pane 5 is a plate-like member having fixed form property (which is not deformed), there is no possibility that the window will difficult to see through as the result of its being expanded or contracted by any change in external temperature. Thus, it will not be creased, deformed, or become waved. Further, since the window is difficult to be injured, there is no possibility that it will become cloudy and lose its transparency. Furthermore, since it is sufficient to exchange only the transparent pane 5 when the transparency deteriorates, the window can be easily exchanged, thus reducing cost.

In carrying out the method according to the present invention, the pliant sheet remains uncut and is not deformed either prior to or at the time of attaching the receiving member 2, and the attachment of receiving members 2 to the sheet 1 is easy. In this connection, if a portion of sheet 1 is cut before receiving members 2 are attached, the remaining sheet 1 may contract and may be deformed. As a result, the dimension of the opening portion 8 (FIG. 3) and that of the receiving member 2 become in disagreement with each other, and the attachment or receiving members 2 becomes difficult.

ADVANTAGES OF THE INVENTION IN USE

The enclosure having windows according this invention as the following advantages:

1. Since the window assembly is comprised of receiving members 2, holding member 3, cover stop member 6, and rigid transparent pane 5 the structure is simple.

2. In the case where the pane 5 deteriorates, it is possible to easily exchange only the pane 5. In addition, since the rigid pane 5 is not especially expensive, even if exchange is carried out every time transparency deteriorates, the economic burden is small. Accordingly, it is possible to exchange the pane 5 even before it fully deteriorates to always maintain satisfactory transparency. Thus, safety and comfortable steering of cruiser 1 can be conducted.

3. Since receiving members 2 and holding member 3 can be attached to an existing flexible sheet enclosure without any special technique, even an amateur (e.g. owner of a cruiser) can easily attach the window.

4. Since receiving members 2 and holding member 3 are attached to a flexible existing sheet 1, any harmful effect caused by blowing in a wind storm or vibration is absorbed so the window or sheet is difficult to injure.

5. It is to be understood that while the present invention is most suitable for use in combination with the vinyl enclosure of a cruiser, such window may be attached on a tent, warehouse, or curtain wall or on an agricultural structure, thus making it possible to use it as an eyehole window or a lighting window in may structures.

The method of attaching the transparent window of this invention has the following advantages:

1. Since an approach can be employed to attached receiving members 2 and holding member 3 on an existing sheet without specially processing such a sheet, even an amateur can easily perform the work to attach them.

2. Since receiving members 2 and holding member 3 are attached on a sheet 1 before the sheet 1 is cut, there is no possibility that the sheet 1 may be deformed as in the case where the sheet 1 is cut in advance. Thus, it is easy to attach receiving members 2 and holding member 3 on sheet 1.

What is claimed is:

1. A window assembly for attaching a rigid window pane to a flexible sheet comprising a first frame member having a first planar surface placed in contact with one side of said sheet and a second planar surface adapted to receive the window pane, a second frame member having a contour similar to that of said first frame member and a planar surface placed in contact with the other surface of the sheet in opposition to said first planar surface, means for securing said first and second frame members together with the sheet clamped between said first and second frame members, a third frame member having a contour similar to that of said first frame member to cover said second planar member and engage the peripheral surface of the window pane received in said first frame member and means for fastening said third frame member to said first frame member to secure said window pane in fixed position.

2. The window assembly according to claim 1, including seal means interposed between the third frame member and the surface of said window pane.

3. The window assembly according to claim 1, wherein at least one of said first, second, and third frame members are formed of a plurality of arcuate corner sections and linear intermediate sections arranged in end to end relationship to form a continuous enclosed frame, said corner and intermediate sections having ends provided with means for interlocking with the next adjacent section to form a fixed joint.

4. A method for attaching a transparent window to a flexible sheet, comprising the steps of:
providing a window pane receiving member in contact with the inner surface or the outer surface of the flexible sheet;
providing a holding member in contact with said flexible sheet on the opposite side of said receiving member to fix said flexible sheet between said holding member and said receiving member to form a window frame;
cutting and removing the portion of said sheet inside said window frame;
disposing a rigid transparent pane on said receiving member in the opening portion formed by the removal of said sheet portion;
providing a stop member in contact with said window frame on the outside of said rigid transparent pane; and
fixing said rigid transparent pane between said window frame and said stop member.

* * * * *